US009370789B2

(12) United States Patent
Clemen

(10) Patent No.: US 9,370,789 B2
(45) Date of Patent: Jun. 21, 2016

(54) METHOD FOR PRODUCING A COMPONENT BY DIRECT LASER DEPOSITIONING USING FIRST AND SECOND LASERS OPERATED AT DIFFERENT POWERS

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 153 days.

(21) Appl. No.: 14/304,421

(22) Filed: Jun. 13, 2014

(65) Prior Publication Data

US 2015/0030787 A1 Jan. 29, 2015

(30) Foreign Application Priority Data

Jul. 24, 2013 (DE) .......................... 10 2013 214 493

(51) Int. Cl.
| | |
|---|---|
| C23C 14/28 | (2006.01) |
| B05B 9/00 | (2006.01) |
| B05D 1/38 | (2006.01) |
| B28B 1/00 | (2006.01) |
| B22F 3/105 | (2006.01) |
| B29C 67/00 | (2006.01) |

(52) U.S. Cl.
CPC .................. B05B 9/002 (2013.01); B05B 9/005 (2013.01); B05D 1/38 (2013.01); B22F 3/1055 (2013.01); B28B 1/001 (2013.01); B29C 67/0085 (2013.01); B29C 67/0092 (2013.01); B22F 2003/1056 (2013.01); B22F 2003/1058 (2013.01); B29C 67/0077 (2013.01); B29C 67/0096 (2013.01); Y02P 10/295 (2015.11)

(58) Field of Classification Search
CPC ........ C23C 14/28; B05B 9/002; B05B 9/005; B05B 1/38
See application file for complete search history.

(56) References Cited

U.S. PATENT DOCUMENTS

| | | | |
|---|---|---|---|
| 5,985,204 A | 11/1999 | Otsuka et al. | |
| 6,007,764 A | 12/1999 | Benda et al. | |
| 6,183,817 B1 * | 2/2001 | Gersonde | G21K 5/04 |
| | | | 250/251 |
| 7,378,133 B2 * | 5/2008 | Yamazaki | C23C 14/12 |
| | | | 118/719 |

(Continued)

FOREIGN PATENT DOCUMENTS

| | | |
|---|---|---|
| DE | 19818469 A1 | 10/1998 |
| DE | 19953000 A1 | 5/2001 |

(Continued)

OTHER PUBLICATIONS

Dutta, B., et al., "Additive Manufacturing by Direct Metal Deposition". Advanced Materials & Processes, May 2011, pp. 33-36.*

(Continued)

*Primary Examiner* — Bret Chen
(74) *Attorney, Agent, or Firm* — Timothy J. Klima; Shuttleworth & Ingersoll, PLC

(57) ABSTRACT

A method for producing a component provided with a supporting structure includes using at least one first laser for layer by layer manufacturing of the component out of a powdery material, using at least one second laser for producing a supporting structure, supporting the component, layer by layer out of the powdery material and operating the at least one first laser with a lower power than a power of the at least one second laser.

5 Claims, 1 Drawing Sheet

(56) References Cited

U.S. PATENT DOCUMENTS

| | | | |
|---|---|---|---|
| 7,661,387 B2* | 2/2010 | Poullos | A47J 36/025 118/308 |
| 7,794,800 B2* | 9/2010 | Clark | C23C 14/165 204/192.15 |
| 2003/0207132 A1* | 11/2003 | Sambasivan | C23C 8/02 428/469 |
| 2004/0094728 A1 | 5/2004 | Herzog et al. | |
| 2007/0176312 A1* | 8/2007 | Clark | B22F 3/1055 264/40.1 |
| 2008/0173386 A1* | 7/2008 | Clark | B22F 3/1055 156/73.1 |
| 2009/0017318 A1* | 1/2009 | Ruuttu | C23C 14/20 428/457 |
| 2009/0117352 A1* | 5/2009 | Burrows | B22F 3/1055 428/209 |
| 2009/0176007 A1 | 7/2009 | Uckelmann | |
| 2013/0064706 A1 | 3/2013 | Schwarze et al. | |
| 2013/0277891 A1 | 10/2013 | Teulet | |
| 2014/0334924 A1 | 11/2014 | Satzger et al. | |

FOREIGN PATENT DOCUMENTS

| | | |
|---|---|---|
| DE | 102005050665 A1 | 4/2007 |
| DE | 102011086889 | 5/2013 |
| EP | 2119530 | 11/2009 |
| FR | 2974316 | 10/2012 |

OTHER PUBLICATIONS

Pinkerton, Andrew J., et al., "Advances in the modeling of laser direct metal deposition". Journal of Laser Applications, Laser Additive Manufacturing, vol. 27, No. S1, Feb. 2015, pp. S15001-1 to S15001-7.*

Bartkowiak, Konrad, "Direct laser deposition process within spectrographic analysis in situ". Physics Procedia 5 (2010) 623-629.*

German Search Report dated Oct. 31, 2013 from counterpart app No. 10 2013 214 493.8.

European Search Report dated Jan. 20, 2015 for counterpart app. No. 14169864.7.

* cited by examiner

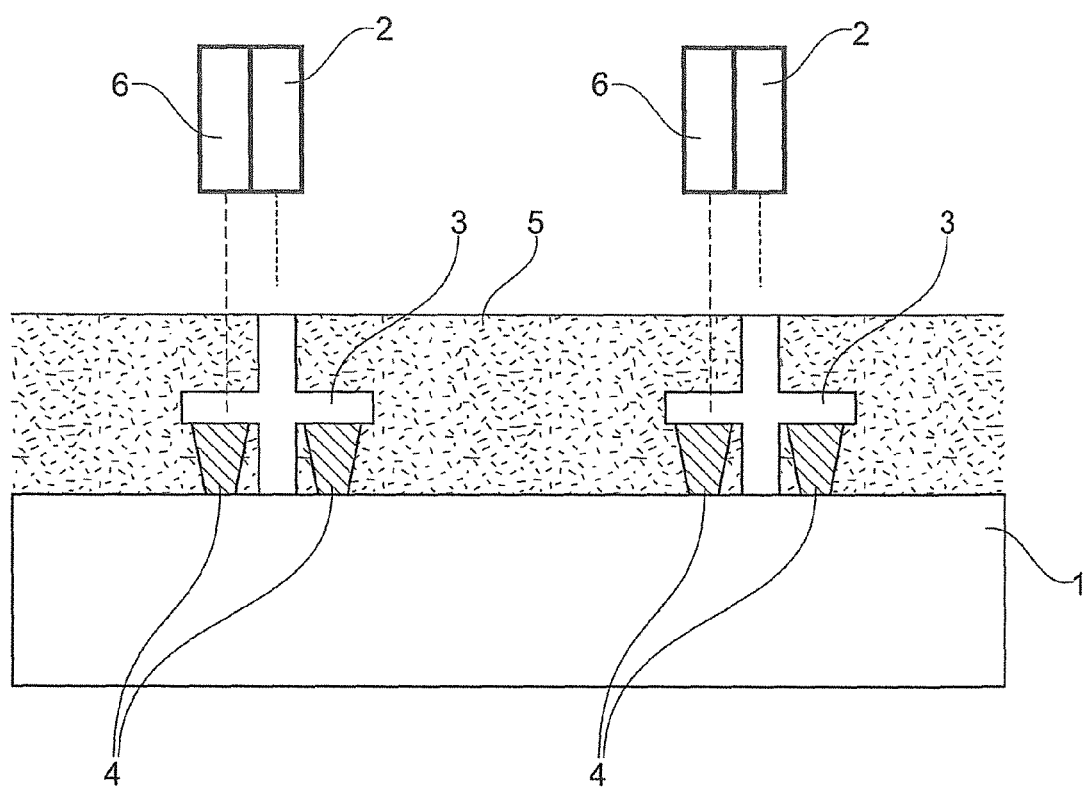

METHOD FOR PRODUCING A COMPONENT BY DIRECT LASER DEPOSITIONING USING FIRST AND SECOND LASERS OPERATED AT DIFFERENT POWERS

This application claims priority to German Patent Application DE102013214493.8 filed Jul. 24, 2013, the entirety of which is incorporated by reference herein.

This invention relates to a laser depositioning device with a machine bed, onto the surface of which can be deposited a powder material which can be melted on layer by layer using a laser. The invention furthermore relates to a method for producing a component by means of a laser depositioning method (DLD, Direct Laser Repositioning).

It is possible with a layered laser melting method to produce a component layer by layer out of a metallic, ceramic or non-metallic powder material. The powder material is here melted layer by layer using a laser, so that a layered build-up of the component is achieved.

DLD devices include, in addition to an envelope, a control unit, a material supply for the powder material and a material provisioning device, a machine bed on which the powder material is placed layer by layer and then processed layer by layer. Furthermore, at least one laser is provided which melts the powder material layer by layer, thereby building up the component. Due to the layered depositioning of the powder material, the bed is, at the conclusion of the manufacturing process, completely filled with powder material, with the component produced layer by layer being embedded into the remaining powder material.

Depending on the geometry of the component to be produced, it is necessary to produce supporting structures to support overhangs of the component. This prevents deformations of the component during its layered build-up. The supporting structure is then separated from the finished component and disposed of.

It is known to use several lasers at the same time, for example to produce several components simultaneously.

The previously known procedures have the disadvantage that both the component and the supporting structure are manufactured using the same laser. Manufacturing the component requires optimum quality, in particular with regard to surface quality, porosity and other material properties. With the known procedures, the supporting structure is thus produced in the same quality as the component itself.

The manufacture of the component is dependent on the quantity of powder material processed (melted) during a unit of time. Hence a greater quantity of powder material can be melted with a stronger laser. This leads to a shortening of the manufacturing times, which in turn leads to a cost reduction. However, the quality of a component greatly depends on the melting speed of the powder material, and higher speed leads to lower component quality. For that reason, it is not possible to arbitrarily increase the manufacturing speed of the component during the laser depositioning method.

The object underlying the present invention is to provide a device and a method of the type specified at the beginning which, while being simply designed and easily and cost-effectively embodied, enable the production of high-quality components with reduced manufacturing times.

It is a particular object of the present invention to provide solution to the above problems by the combinations of the features described herein. Further advantageous embodiments of the present invention become apparent from the present description.

It is thus provided in accordance with the invention that at least one first laser is used for layer by layer melting of the powder material for manufacturing the component, while at least one second laser is used to build up the supporting structure layer by layer. It is provided here in accordance with the invention that the second laser is provided with a higher power than the first laser. In accordance with the invention, two different lasers with differing power are therefore used to obtain two different work results, i.e. a high-quality component and a supporting structure of lower quality. A higher laser power is therefore required to produce the supporting structure of lower quality. This can be achieved in accordance with the invention by using lasers of differing power. The power differences can be up to a factor of 5. It is possible in accordance with the invention to use the higher power of the laser for producing the supporting structure such that larger volumes of powder material are melted by this laser in the same unit of time. This can be assured by appropriate focusing of the laser, for example. It is also possible to use the lasers for differing operating times, so that the second laser for producing the supporting structure is used only for a shorter period with a high melting speed and hence lower quality. It is also possible to design both the device and the method such that for production of the supporting structure the laser is moved relative to the machine bed such that it melts, in the same unit of time, a larger area of powder material than the laser for producing the high-quality component.

Since the volume of the supporting structure and the volume of the component are frequently very similar during the production of complex components, the procedure in accordance with the invention can result in a considerable time saving for the manufacturing operation. This can be, for example, up to 40% compared with the procedure known from the state of the art. This leads to a corresponding cost reduction for the manufacture of the component.

It is preferably assured by means of a machine control unit that the first and the second lasers do not hinder each other when they are operating parallel to one another. It is therefore possible to produce complex components and corresponding supporting structures effectively and in a short time by parallel operation of the lasers.

In accordance with the invention, the lasers can be arranged in a suitable manner relative to one another, for example parallel, it is however also possible to arrange the lasers at an angle to one another in respect of their active axes.

The invention is described in the following on the basis of an exemplary embodiment in conjunction with the drawing, in which the sole FIG. 1 shows a schematic side view of a component produced on a machine bed with a supporting structure.

The FIGURE shows in schematic form a machine bed 1 on which powder material 5 is provided. The illustration in FIG. 1 shows in an exemplary representation a completed component 3, which is thus embedded up to its top edge into the powder material 5. Lateral areas of the component 3 are each supported by a supporting structure 4. Above the powder material 5 is a first laser 2, next to which a second laser 6 is arranged.

At the start of production, a thin layer of powder material 5 is deposited onto the machine bed 1 and selectively melted by the two lasers 2 and 6. The laser 2 here has a lower power for producing the component 3 in high quality, while the laser 6 has a higher power for producing the supporting structure 4 in lower quality in a shorter period of time. At the transition to the laterally projecting areas of the component 3, the latter is produced exclusively by the first laser 2, while the second laser 6 is no longer used.

The result is that the production of the component 3 can be achieved within a substantially shorter period of time, since the supporting structure 4 is produced using the second laser 6 in a lower quality within a shorter time.

LIST OF REFERENCE NUMERALS

1 Machine bed
2 First laser
3 Component
4 Supporting structure
5 Powder material
6 Second laser

What is claimed is:

1. A method for producing a component and a supporting structure with a laser depositioning device, comprising:
    providing a laser depositioning device with at least one first laser and at least one second laser;
    using the at least one first laser for layer by layer manufacturing of the component out of a powdery material, and
    using the at least one second laser for producing a supporting structure, supporting the component, layer by layer out of the powdery material,
    operating the at least one first laser with a lower power than a power of the at least one second laser to:
        produce the component with the at least one first laser at a lower rate of deposition and higher quality as compared to producing the supporting structure with the at least one second laser, and
        produce the supporting structure with the at least one second laser at a higher rate of deposition and lower quality as compared to producing the supporting structure with the at least one first laser.

2. The method in accordance with claim 1, and further comprising depositing a same coating thickness of the powdery material with each of the at least one first laser and the at least one second laser.

3. The method in accordance with claim 1, and further comprising depositing a larger amount of the powdery material on the supporting structure with the at least one second laser than an amount of powdery material deposited on the component with the at least one first laser in a same amount of time.

4. The method in accordance with claim 1, and further comprising providing that the power of the at least one first laser is smaller than the power of the at least one second laser by up to a factor of 5.

5. The method in accordance with claim 1, and further comprising focusing the at least one first laser differently than the at least one second laser.

* * * * *